INVENTOR.
JOHN E. CADY

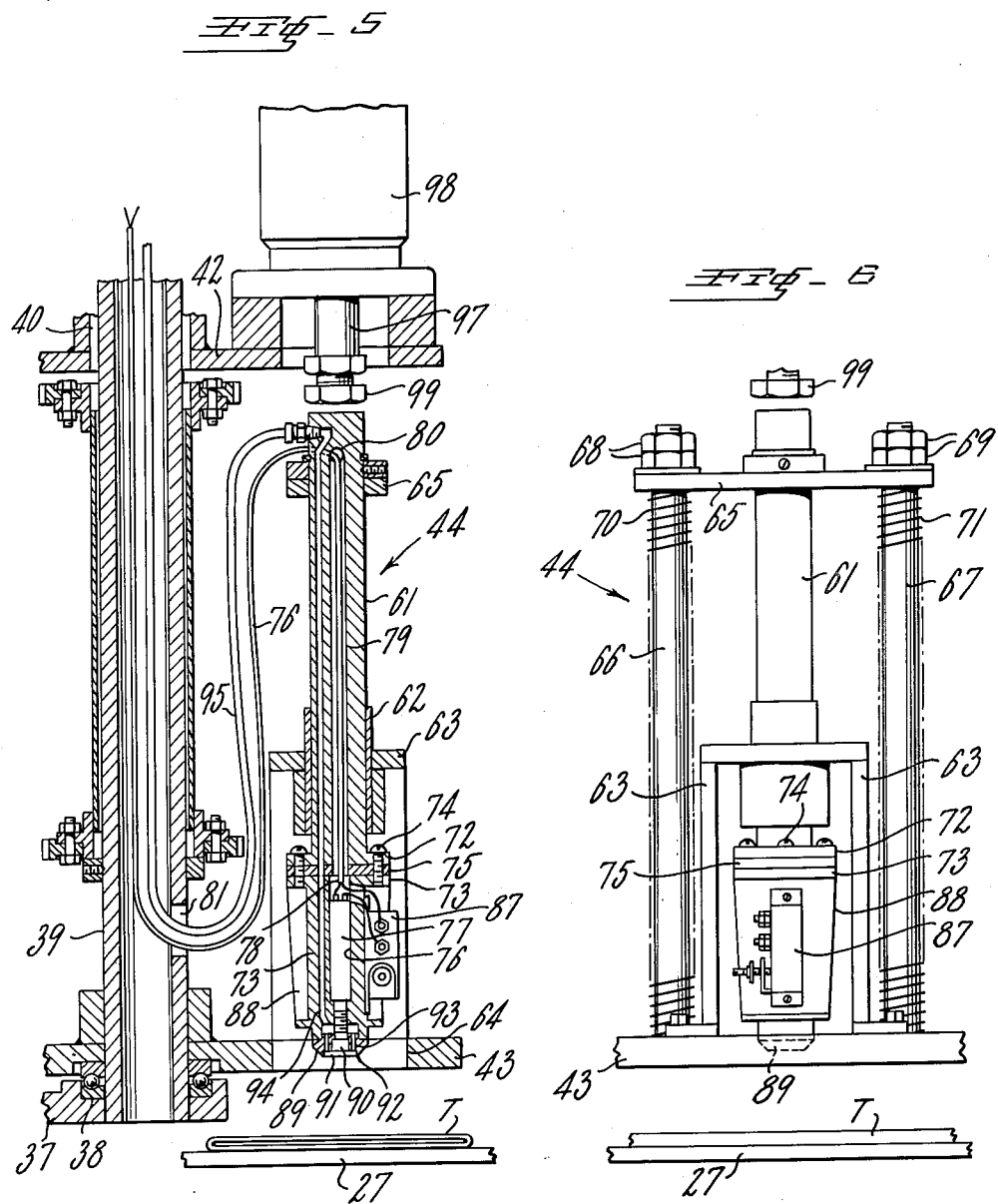

Sept. 13, 1955  J. E. CADY  2,717,627
APPARATUS FOR MANUFACTURING INNER TUBES
Filed Sept. 17, 1952  6 Sheets-Sheet 5
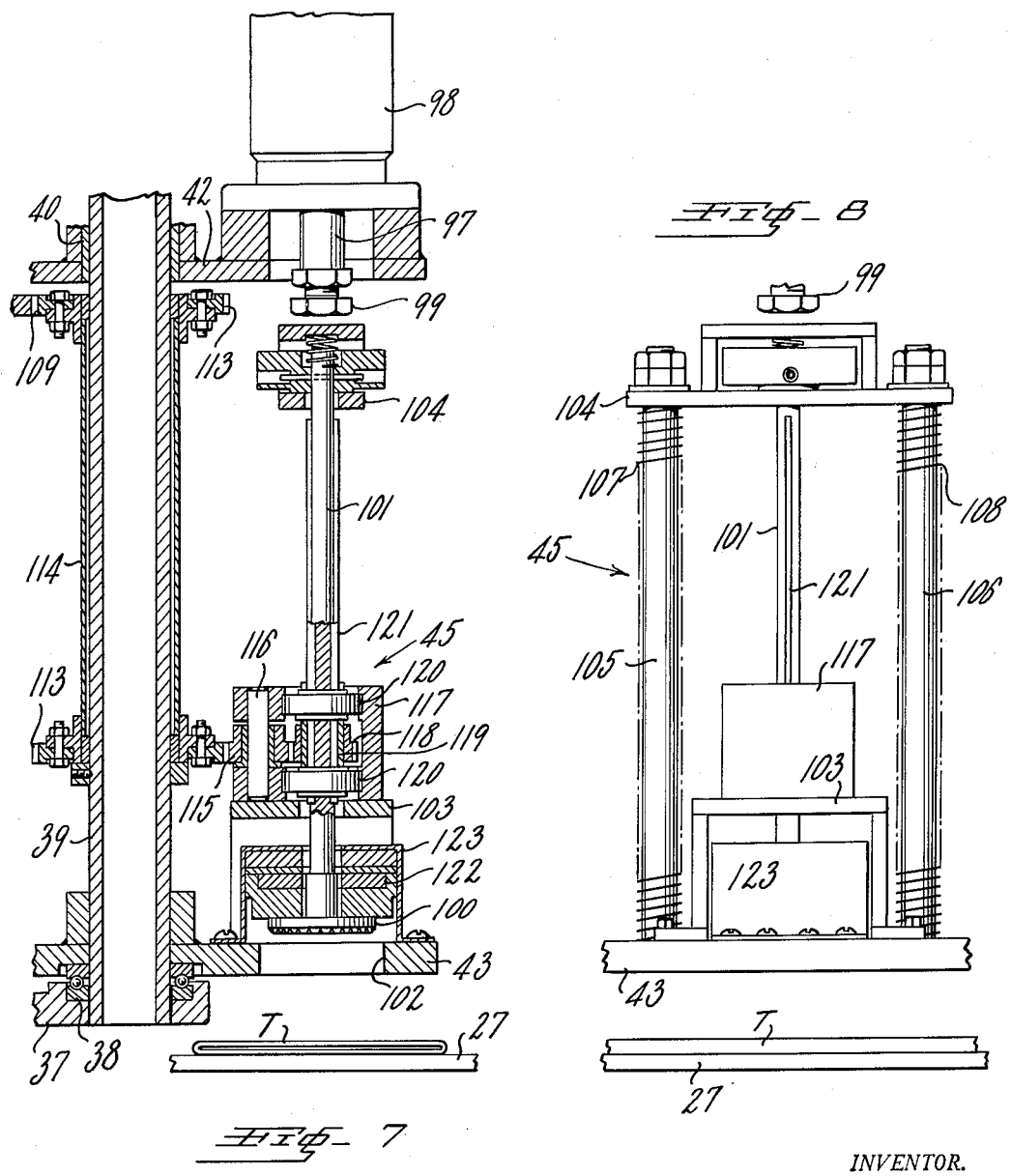
INVENTOR.
JOHN E. CADY
BY
Irwin M. Lewis
ATTORNEY

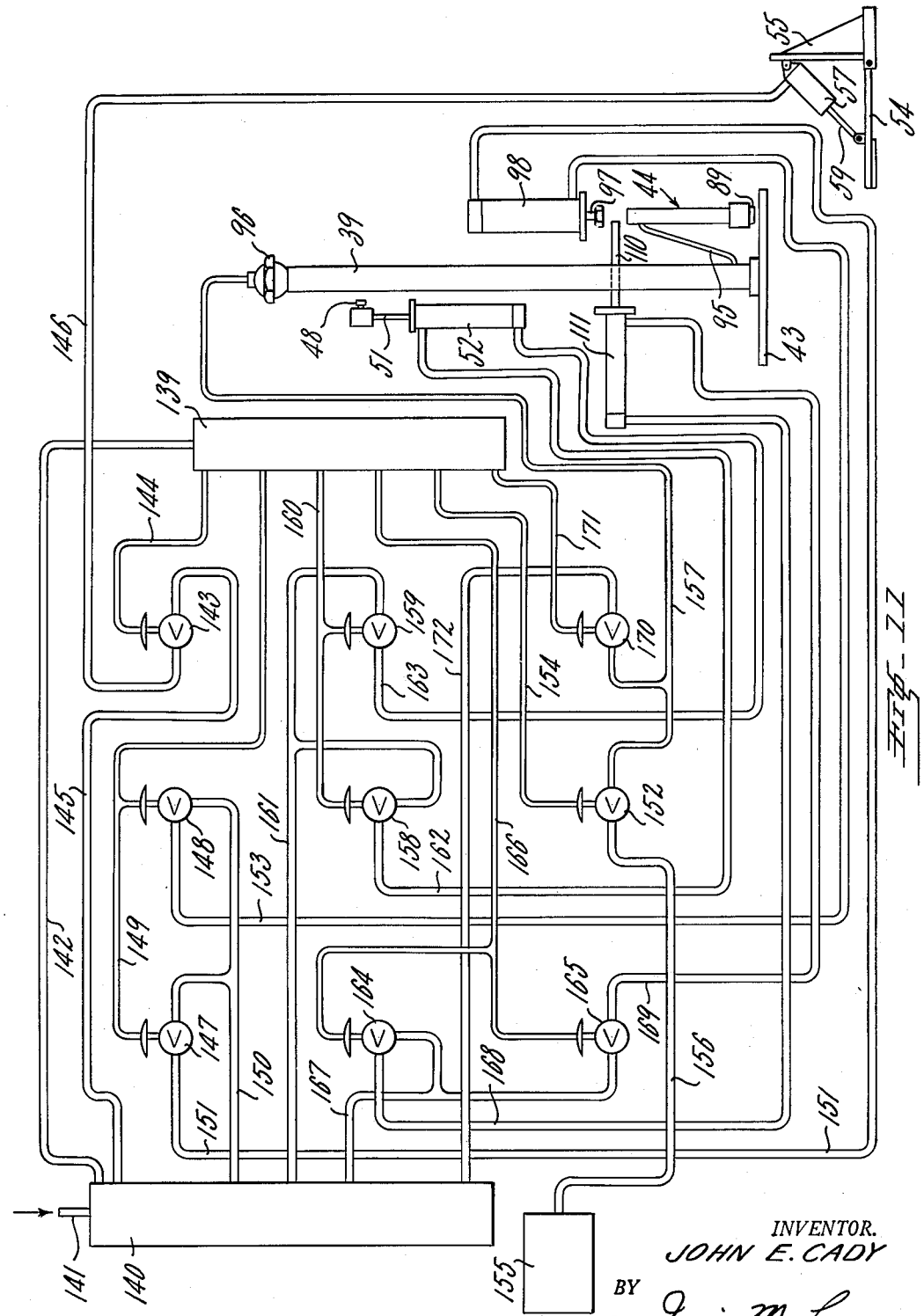

United States Patent Office 2,717,627
Patented Sept. 13, 1955

2,717,627

APPARATUS FOR MANUFACTURING INNER TUBES

John E. Cady, Indianapolis, Ind., assignor to United States Rubber Company, New York, N. Y., a corporation of New Jersey Application September 17, 1952, Serial No. 310,090

9 Claims. (Cl. 154—9)

This invention relates to apparatus for use in manufacturing inner tubes. In particular, it relates to a combined machine for trimming and splicing together the ends of a section of uncured inner tube stock and for performing simultaneously therewith operations necessary in the application of the rubber based valve stem to the section of inner tube stock including, punching a hole in the tube stock, cleaning the surface around the punched hole and applying a rubber based valve stem over the punched hole.

Heretofore, such operations had to be formed on two or more separate machines which necessitated transfer of the stock from one machine to another. Uncured stock is very easily deformed in handling and this handling of the stock in transferring it from one machine to another deformed the stock so that inner tubes so produced were often non-uniform in size, shape and thickness.

Performing the trimming and splicing of the inner tube stock on one machine and the valve applicating on another machine also resulted in non-uniform placement of the valve stem with respect to the splice. It is important that the valve stem be placed on the tube at a fixed distance from the splice. The reason for this is that inner tube curing molds are usually provided with venting grooves for venting trapped air from between the surfaces of the tube and the mold. The greatest trouble from trapped air occurs in the region of the splice. Accordingly, it is desirable to place the tube in the mold with the splice located in the region of these venting grooves. The placement of the tube in the mold, however, is determined by the valve stem as it must extend through the opening provided therefor in the mold. As the venting grooves in the mold are provided at a fixed distance from the valve stem opening, it is important that the valve stem be applied to the tube at the same fixed distance from the splice so that when the tube is placed in the mold with the valve stem extending through the valve stem opening, the splice will be located in the proper relationship to the venting grooves. If this cannot be done because of the improper placement of the valve stem, the tube may be defective by reason of the presence of trapped air in the region of the splice.

It is one object, therefore, of the present invention to provide a single machine which will automatically perform the necessary operations for applying a valve stem to a section of inner tube stock contemporaneously with the trimming and splicing of the section of inner tube stock to thereby minimize the handling of the uncured inner tube stock and decrease the manufacturing time for the tube.

Another object is to provide a machine which will apply the valve stem at a uniform distance from the splice to thereby insure that the splice will be in proper relationship to the venting groove when the tube is placed in a curing mold.

Another object is to provide a machine having novel apparatus for performing operations necessary in the application of a rubber based valve stem which lends itself readily to automatic operation.

A still further object of the invention is to provide a machine for manufacturing inner tubes having a novel punch construction for punching holes in a section of inner tube stock in the application of rubber based valve stems.

Other objects and advantages of the present invention will become apparent from the following description when read in conjunction with the accompanying drawings, wherein, Fig. 1 is a front elevational view of the combined machine of the invention;

Fig. 5 is a side sectional view showing the details of the punch for punching a hole in a section of inner tube stock;

Fig. 6 is a front elevational view of the punch of Fig. 5;

Fig. 7 is a side sectional view showing the detail of the cleaning tool for cleaning the surface of the tube surrounding the punched hole;

Fig. 8 is a front elevational view of the cleaning tool of Fig. 7;

Fig. 9 is a side sectional view showing the details of the valve stem applicator for applying a valve stem over the punched hole;

Fig. 10 is a front elevational view of the valve stem applicator of Fig. 9; and, Fig. 11 is a schematic drawing of the fluid control system for the valve stem applicating apparatus.

Figure 1:
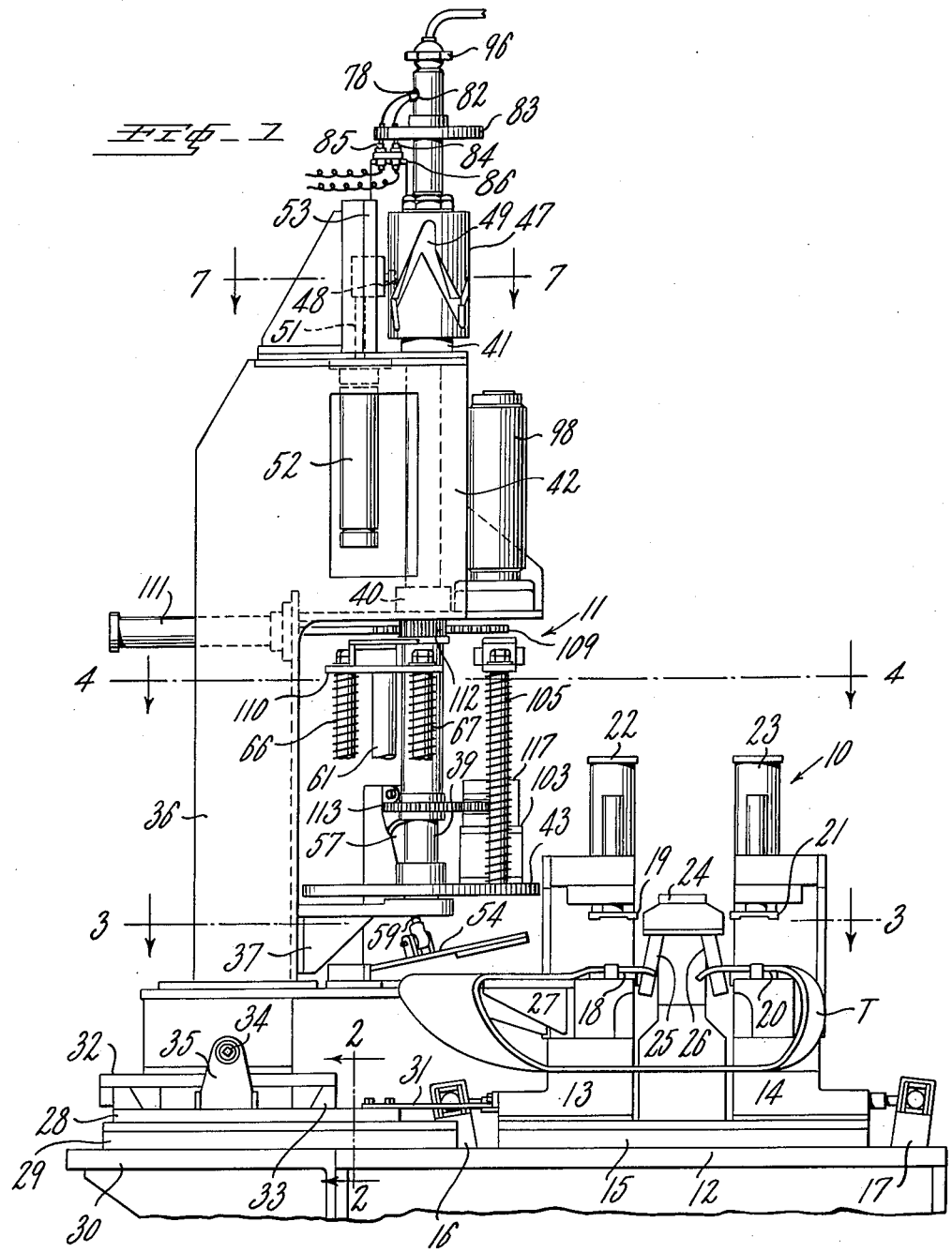
Figure 2:
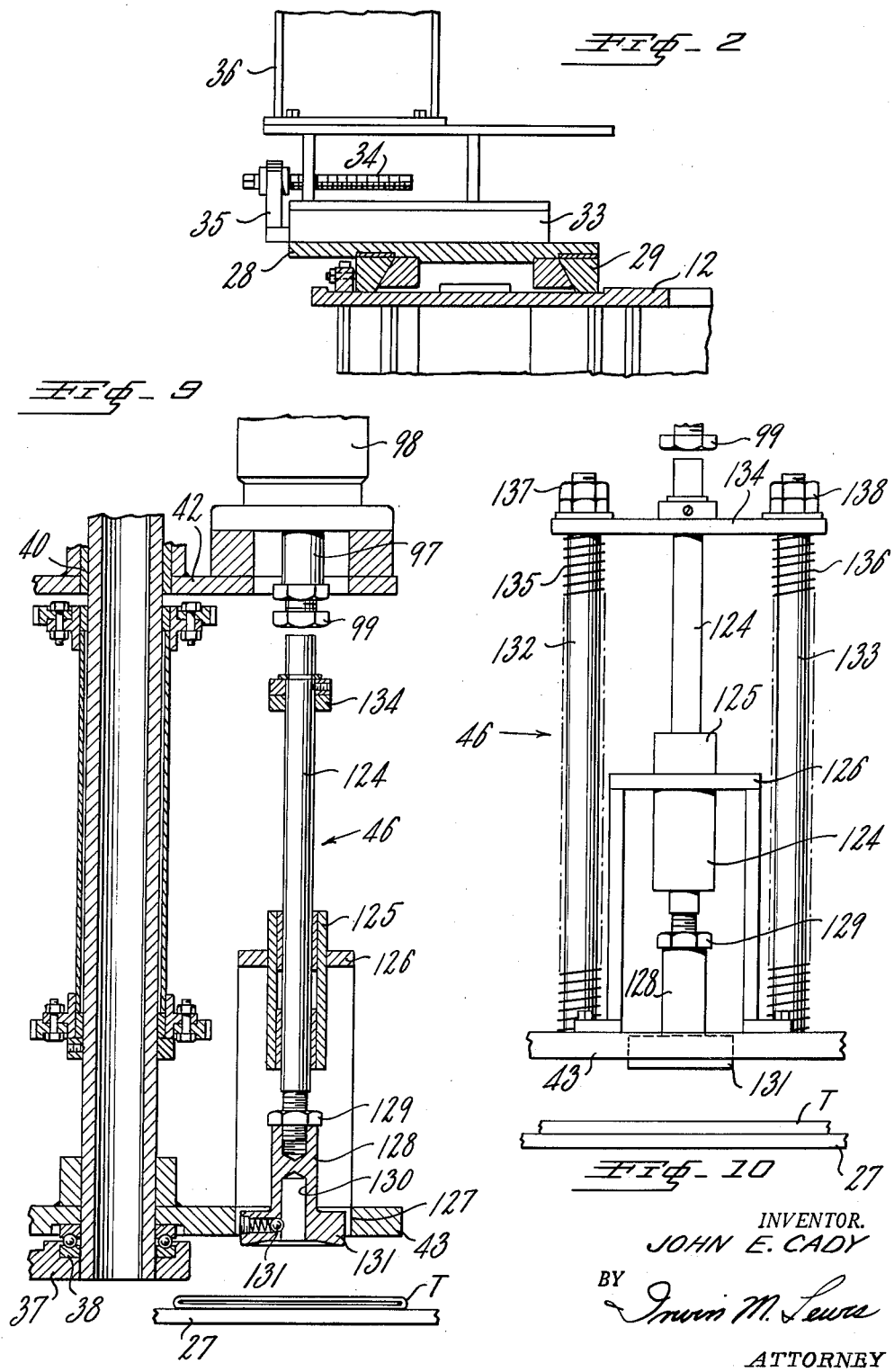
Fig. 2 is a sectional view taken on the line 2—2 of Fig. 1.

Referring to the drawings and in particular to Fig. 1 of the drawings, there is shown one embodiment of the combined machine of the present invention. For the purpose of description, the machine can be divided into two parts which may be entitled according to their primary function as Trimming and Splicing Apparatus, identified in the drawings by the reference number 10 and Valve Stem Applicating Apparatus, identified in the drawings by the reference number 11.

The trimming and splicing apparatus 10, as shown in the drawings, is of the type disclosed in U. S. Patent No. 2,576,940 and the details thereof form no part of the present invention except, insofar as they cooperate with the valve stem applicating apparatus 11 to provide a combined machine. The description of the trimming and splicing apparatus 10 herein is therefore restricted to the primary elements thereof. Reference is made to U. S. Patent No. 2,576,940 for a more detailed description of its structure and function.

Referring to Fig. 1 of the drawings, the trimming and splicing apparatus 10 includes a base 12 and two carriages 13 and 14 mounted for sliding movement towards and away from each other on ways 15 secured to the base 12. The carriages are moved by levers 16 and 17 which are actuated by a suitable power source (not shown). A pair of clamping jaws are mounted on the top of each carriage and serve to clamp the end portions of a section of inner tube stock T. A stationary jaw 18 and a movable jaw 19 are mounted on carriage 13 and a stationary jaw 20 and a movable jaw 21 are mounted on carriage 14. Jaw 19 is moved towards jaw 18 by an air cylinder 22 to clamp one end of the tube stock T therebetween and jaw 21 is moved toward jaw 20 by an air cylinder 23 to clamp the other end of the inner tube stock T therebetween.

A third carriage 24 is mounted for movement horizontally and at right angles to the path of movement of the carriages 14 and 13. Carriage 24 has secured thereto knives 25 and 26 which serve to trim the ends of the tube stock T extending from opposed faces of the clamps carried by the carriages 14 and 13 when the carriages are spaced apart. After trimming, the carriages 14 and 13 are moved together by the levers 16 and 17 to bring the freshly trimmed ends into abutting engagement to form a splice. As above described, the trimming and splicing apparatus is of the same type as that described in U. S. Patent No. 2,576,940.

One differentiating feature of the present invention, is the provision of a horizontally extending anvil 27 secured to the carriage 13 and movable therewith. The anvil 27 provides a support for a portion of the inner tube stock T so that a valve stem may be applied thereto by the valve applicating apparatus 11 as will hereinafter be described.

Referring to Figs. 1, 2, 3 and 4 the valve stem applicating apparatus 11 is movable with the carriage 13 and the anvil 27 so that application of a valve stem may be performed simultaneously with the trimming and splicing operations and so that the valve stem will be applied at a fixed distance from the splice. To this end, the valve stem applicating apparatus 11 is mounted on a slide 28 which is slidably mounted for movement in the same direction as the carriage 13 on ways 29 secured to an extension 30 of the base 12. The slide 28 is coupled to the carriage 13 for simultaneous movement therewith by means of rigid straps 31 secured at one end to the slide 28 and at the other end to the carriage 13.

A saddle 32 is mounted for transverse adjustment on transversely extending ways 33 secured to the top of the slide 28. The saddle 32 is adapted to be moved by rotation of a traversing screw 34 which is journaled at one end in a bracket 35 secured to the slide 28 and threaded at the other end into the saddle 32. As will later be described in detail, the transverse movement of the saddle 32 is to provide for adjustment of the valve applicating apparatus 11 relative to the anvil 27.

Secured to and extending upwardly from the saddle 32 is a supporting framework 36. A knee bracket 37 is secured to and extends outwardly from the framework 36 adjacent the lower end thereof. Bracket 37 supports a thrust bearing 38 as best shown in Figs. 5, 7, and 9 which in turn supports hollow rotatable shaft 39. Additional lateral support for the shaft 39 is provided by bearings 40 and 41 secured to an overhanging portion 42 of the framework 36.

A circular platform or turret 43 is secured to and is rotatable with the shaft 39. Turret 43 extends over the anvil 27 and serves, as will hereinafter be described in detail, to support a plurality of reciprocal tool assemblies 44, 45 and 46, shown individually in Figs. 5, 7 and 9, for performing the necessary operations in applying a rubber base valve stem to the inner tube stock T carried by the anvil 27.

The turret 43 is adapted to be indexed to bring the tool assemblies 44, 45 and 46 sequentially into alignment with the anvil 27 so that each may perform its intended operation. The mechanism for indexing the turret 43 includes, as shown in Fig. 1, a barrel cam 47 secured to the shaft 39 adjacent the upper end thereof and a cam actuator 48 which engages a cam groove 49 formed in the surface of the barrel cam 47. Vertical reciprocation of the cam actuator 48 serves to rotate the barrel cam 47 to thereby index the shaft 39 and the turret 43 secured thereto. The cam actuator 48 is attached to the end of a piston rod 51 of an air cylinder 52 secured to the framework 36 and is reciprocated by the admission of air under pressure to the cylinder 52. The cam actuator 48 is guided for vertical movement in ways 53 secured to the top of the framework 36. One complete reciprocation of the actuator 48 indexes the turret 120°.

Figure 3:
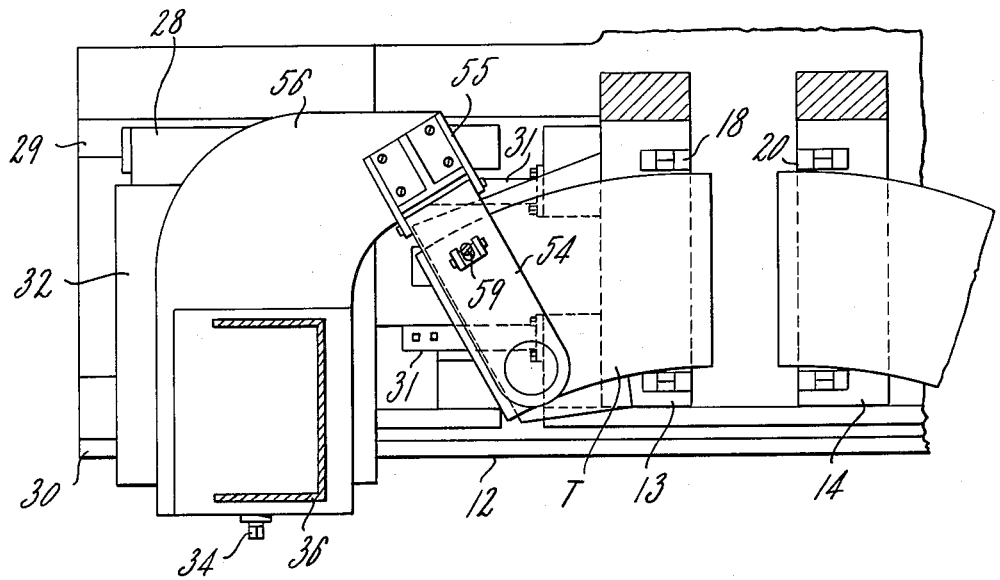
Fig. 3 is a sectional view taken on the line 3—3 of Fig. 1.
Figure 4:
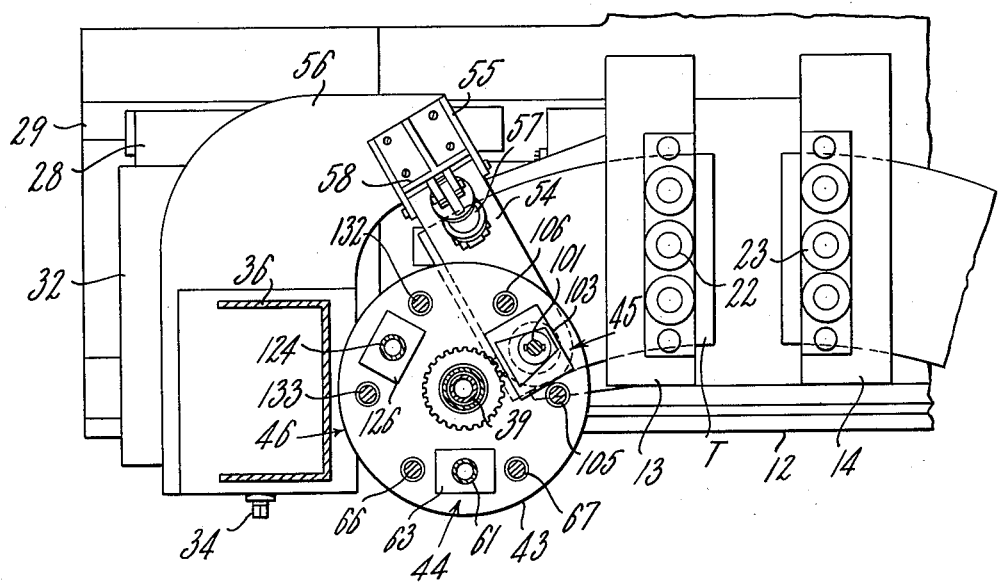
Fig. 4 is a sectional view taken on the line 4—4 of Fig. 1.

As best shown in Figs. 1, 3, and 4, the inner tube stock T is adapted to be clamped against the anvil 27 by means of a clamp 54 which is pivotally attached to a bracket 55 rigidly attached to a horizontally extending plate 56 secured to the saddle 32. The clamp 54 is adapted to be pivoted towards and away from the anvil 27 to clamp the inner tube stock T by means of an air cylinder 57. The air cylinder 57 is pivotally attached to a vertically extending plate 58 forming part of the bracket 55, and its piston rod 59 is pivotally attached to the clamp 54. The clamp 54 is provided with a circular opening 60 adjacent the free end thereof through which the tools 44, 45 and 46 may engage the inner tube stock T to perform their intended operations.

Tool assembly 44, which is shown in detail in Figs. 5 and 6, is for punching a hole in the inner tube section T. Tool assembly 45, shown in Figs. 7 and 8 is for cleaning the surface of the tube section T around the hole punched by the tool assembly 44 to provide a tacky surface for the application of a rubber based valve stem over the punched hole. The tool assembly 45 forms the subject matter of copending application, Serial Number 269,061 filed January 30, 1952 by Wilbur E. Harris. Tool assembly 46, shown in Figs. 9 and 10 is a valve stem applicator which serves to support a valve stem and press it over the punched hole. The tool assemblies 44, 45, and 46 are spaced 120° apart around the turret.

Referring to Figs. 5 and 6, the tool assembly 44 for punching a hole in the tube section T includes an elongated shaft 61 which is slidably mounted in a bearing 62 secured to a U-shaped bracket 63. Bracket 63 is secured to the upper surface of the turret 43 and bridges an opening 64 in the turret 43 through which the punch 44 is adapted to be extended to punch a hole in the section of inner tube stock T carried by the anvil 27. A cross arm 65 is secured to the shaft 61 adjacent its upper end and is provided with openings adjacent each end thereof through which parallel guide rods 66 and 67 extend. Guide rods 66 and 67 are secured to the upper surface of the turret 43 and serve in conjunction with the cross arm 65 to guide the shaft 61 for vertical movement. Nuts 68 and 69 threaded on the upper ends of the rods 66 and 67 respectively serve as stops to limit upward movement of the cross arm 65 and the shaft 61 secured thereto. Compression springs 70 and 71 surround guide rods 66 and 67 respectively and serve to normally urge the cross arm 65 and shaft 61 upwardly.

The lower end of the shaft 61 is provided with a coupling flange 72. A flanged cutter holder 73 is secured to the flange 72 by means of bolts 74. A washer 75 made of suitable heat insulating material is interposed between the holder 73 and the flange 72.

The cutter holder 73 is provided with an axial bore 76 in which is contained an electrical resistance type heating element 77. Electrical energy is supplied to the heating element 77 by means of wires 78 which extend up through a passage 79 in the shaft 61 and out through an opening 80 in the side wall of the shaft 61 adjacent the upper end thereof. From the opening 80, the wires 78 extend through an opening 81 in the hollow turret shaft 39, up through the hollow shaft 39 and out through a second opening 82 (Fig. 1) provided adjacent the top of the shaft 39. The ends of the wires 78 are connected to a pair of slip rings (not shown) carried by a flange 83 secured to the shaft 39 adjacent the upper end thereof. A pair of brushes 84 and 85 fastened to a bracket 86 secured to the frame-work 36 slidably engage the slip rings carried by the flange 83 to complete the electrical circuit for the heating element 77. The brushes are connected to a source of electrical energy, not shown. Sufficient slack is provided in the wires 78 to allow the shaft 61 to be freely reciprocated.

A thermostat 87 is secured to the exterior surface of the holder 73 and is connected into the electrical circuit to the heating element 77 to control the temperature thereof. Insulating material 88 surrounds the holder 73. The heating element 77 serves to heat a circular cutter 89 secured by means of a screw 90 to the lower end of the holder 83.

The cutter 89 has a hollow circular opening 91 in the lower face thereof providing a circular cutting edge 92. The cutter 89 is provided with small passages 93 which communicate with the circular opening 91 at one end and at the other end with a passage 94 which extends up through holder 73 and the shaft 61. A flexible conduct 95 is connected to the upper end of the passage 94. Conduit 95 passes through opening 81 in the hollow turret shaft 39 and up through the shaft 39 to the upper end thereof where it is connected to a swivel coupling 96 (Fig. 1) by which it can be connected to a source of air under pressure or vacuum as will hereinafter be described. Sufficient slack is provided in the conduit 95 to allow free reciprocation of shaft 61.

The cutter 89 is adapted to be forced against the inner tube section T carried by the anvil 27 by means of the piston rod 97 of an air cylinder 98. Cylinder 98 is secured to the overhanging portion 42 of the framework 36 in alignment with the anvil 27. Admission of air under pressure to the cylinder 98 extends the piston rod 97 so that it engages the upper end of the shaft 61 to force it downwardly to cut a circular hole in the upper layer of the inner tube section T.

The effective length of the piston rod 97 is adjustable by means of a threaded bolt 99 threaded in the end of the piston rod 97. The extent of downward movement of the shaft 61 can, therefore, be varied or adjusted by means of the bolt 99. The downward movement of the shaft 61 is adjusted so that the heated cutter 89 punches only partly through the upper layer of the inner tube section T. A vacuum is applied to the opening 91 in the cutter 89 through passages 93 and 94, and conduit 95, to draw the upper layer of a tube section T against the heated cutting edge 92 of the cutter 89 to complete the hole therethrough. Accidental punching of the lower section of the inner tube section T is thereby eliminated. The application of the vacuum to the opening 91 of the cutter 89 also holds thte slug cut from the inner tube section T until the punch assembly 44 is indexed to another position at which time air under pressure is applied to the opening 91 to eject the slug. After the punching operation, the shaft 61 is returned to its uppermost position by means of the springs 70 and 71 which were compressed when the shaft 61 was moved downwardly.

The cleaning tool assembly 45, as previously stated, forms the subject matter of copending application, Serial No. 269,061, filed January 30, 1952 by Wilbur E. Harris and the details thereof form no part of the present invention except insofar as they cooperate with the other elements of the combined machine of the invention.

Referring to Figs. 7 and 8, the cleaning tool assembly 45 is provided with a circular plowing member 100 which has a grooved lower face. The plowing member 100 is adapted to be forced against the section of inner tube T carried by the anvil 27 and rotated to plow under the originally exposed surface and turn up freshly exposed tacky rubber. This operation may follow or precede the punching operation, to provide a clean tacky surface around the hole punched by the punch assembly 44 so that a rubber based valve stem may be applied to the inner tube section T by the valve applicator assembly 46. The plowing member 100 is secured to the lower end of a reciprocal shaft 101 and is adapted to be extended through an opening 102 in the turret 43 by means of the same air cylinder 98 which was used to reciprocate the punch 44. The turret 43 is indexed to bring the cleaning tool 45 into alignment with the air cylinder 98 after the punching operation. The mounting for the cleaning tool 45 is similar to that of the punch 44 and includes a U-shaped bracket 103 which is secured to the upper surface of the turret 43 and bridges the opening 102 therein, a cross arm 104, guide rods 105 and 106, and compression springs 107 and 108. The shaft 101 and the plowing member 100 attached thereto, are adapted to be rotated by means of a rack 109 secured to the end of a piston rod 110 (Fig. 1) of an air cylinder 111. Air cylinder 111 is secured to the upright framework 36 in a horizontal position so that its piston rod 110 extends toward the turret shaft 39. Rack 109 meshes with a pinion 112 journaled on the turret shaft 39. Pinion 112 is coupled to a second pinion 113 by means of a sleeve 114. Pinion 113 engages a gear 115 journaled on a shaft 116 carried by a block 117 which in turn is secured to the upper side of the U-shaped bracket 103. Gear 115 meshes with gear 118 which is secured to a sleeve 119 journaled in bearings 120 carried by the block 117. Sleeve 119 is keyed to shaft 101 by elongated splines 121. Reciprocation of the rack 109 by the air cylinder 111, therefore, serves to rotate the shaft 101 and the plowing member 100 attached thereto.

The plowing member 100 is adapted to be heated during periods of rest by contact with an electrical resistance type heating element 122 which is secured to the turret 43 by means of a U-shaped strap 123. Heating element 122 is connected to a source of electrical energy through brushes 84 and 85 in the same manner as described in conjunction with heating element 77 of the punch 44. The cleaning tool 45, as above described, is identical with that disclosed in copending application Serial No. 269,061, previously referred to, and reference is made thereto for a more detailed description of its structure and function.

Referring to Figs. 9 and 10 the valve stem applicator assembly 46 includes a vertically extending shaft 124 which is slidably mounted in a bearing 125 which is secured to a U-shaped bracket 126. The bracket 126 is attached to the upper surface of the turret 43 and bridges an opening 127 in the turret 43 through which the tool 46 is adapted to be extended in applying a valve stem to a section of inner tube T carried by the anvil 27. A valve stem holder 128 is threaded on the lower end of the shaft 124 and is adapted to be locked in an adjusted position by means of a lock nut 129. The valve stem holder 128 has an axial bore 130 adapted to receive a rubber covered valve stem. A spring pressed ball detent 131 serves to hold the valve stem in the axially extending bore 130. The valve stem holder 128 is provided with a flanged portion 131 which serves to apply pressure to the flange of a rubber covered valve stem in the application thereof to the tube section T. The mounting for the valve applicator 46 is similar to that provided for the punch 44, and includes guide rods 132 and 133, cross arm 134, compression springs 135 and 136 and stopnuts 137 and 138.

Preparatory to operating the valve applicator 46, a rubber based valve stem is inserted in the axial bore 130 in the valve holder 128. The turret 43 is then indexed to bring the valve applicator 46 into alignment with the air cylinder 98 and the anvil 27. Admission of air under pressure to the air cylinder 98 forces the shaft 124 and valve holder 128 vertically downwardly to tightly press a valve stem carried by the valve stem holder 128 over a hole previously punched in the tube section T by the punch 44 and adhere the valve stem to the tacky surface surroundig the hole prepared by the cleaning tool assembly 45. After the valve stem has been adhered to the tube section T, the air is exhausted from air cylinder 98 and shaft 124 and valve holder 128 are returned to their uppermost portion by the springs 135 and 136.

Operation

In U. S. Patent No. 2,576,940, previously referred to, there is shown a fluid pressure system for controlling the cycle of operation of a trimming and splicing apparatus of the type shown in Figure 1 of the present invention. The present invention contemplates the use of the same fluid pressure system for the operation of the trimming and splicing apparatus 10 and an additional fluid pressure system as shown in Figure 11 to control the operation of the valve applicating apparatus 11. The two control systems are integrated to provide a single system so that the valve applicating operations are performed contemporaneously with the trimming and splicing operations. To this end, the control system shown in Figure 11 is controlled by the same timer as shown in U. S. Patent No. 2,576,940 or by a separate timer operated in synchronism with the timer of U. S. Patent No. 2,576,940.

The timer is identified in Figure 11 by the reference number 139. This timer is a conventional device referred to as a drum type controller. It includes cams for operating pneumatic valves which through the medium of fluid pressure operate other pneumatic diaphragm valves which control the admission of air under pressure to the various air cylinders. The timer is driven by a synchronous motor. Such a timer is described in detail in a patent to Southerland, No. 2,438,724 of March 30, 1948.

Air under pressure is supplied to the fluid system of Figure 11 from a header or manifold 140 which is connected by a conduit 141 to a source of air under pressure, not shown. A conduit 142 leading from the manifold 140 is connected to the timer 139 to provide pressure for operating the various diaphragm valves. Other conduits, as will hereafter be described, connect the various operating air cylinders with the manifold 140.

Preparatory to operating the machine of the invention, a rubber based valve stem is inserted in the valve stem holder 128. A section of inner tube stock T is placed in the machine with its ends on clamping jaws 18 and 20 with portions of the ends thereof extending from the opposed faces of the jaws as shown in Fig. 1. A portion of the inner tube section T is supported on the anvil 27. On initial operation the punch 44 is in alignment with the anvil 27 and the tube section T supported thereby. If the punch 44 is not in proper alignment, adjustment can be made by turning screw 34 as previously described.

When the tube section T is in proper location, the operator presses a push button, not shown, which starts the synchronous motor of the timer 139. This initiates a cycle of operations of the trimming and splicing apparatus 10 as described in U. S. Patent No. 2,576,940 and also initiates the cycle of operations of the valve applicating apparatus 11.

Referring to Fig. 11, which shows the fluid system for the valve applicating apparatus 11, the timer 139 first opens normally closed diaphragm valve 143. Timer 139 is operatively connected to valve 143 by a conduit 144. Opening of valve 143 connects the manifold 140 to the upper end of the air cylinder 57 through conduits 145 and 146. This admits air pressure to cylinder 57 to extend the piston rod 59 thereof to pivot the clamp 54 towards the anvil 27 to clamp the inner tube stock T thereto.

The timer 139 next opens normally closed diaphragm valve 147 and closes normally open diaphragm valve 148. Timer 139 is operatively connected to valves 147 and 148 by conduit 149. Opening of valve 147 connects the manifold 140 to the upper end of cylinder 98 through conduits 150 and 151 and closing valve 148 disconnects manifold 140 from the lower end of the cylinder 98. This admits air pressure to the upper end of cylinder 98 to extend the piston rod 97 thereof to force the punch 44 against the tube section T to punch a hole in the upper layer thereof. Valve 147 is left open only a sufficient period of time to allow the punch 44 to punch the hole in the tube section T. Timer 139 then allows valve 147 to close and valve 148 to open. At the same time it opens a normally closed diaphragm valve 152. Opening of valve 148 connects the manifold 140 with the lower end of the cylinder 98 through conduits 150 and 153 to retract its piston rod 97. Punch 44 then moves upwardly under the influence of the springs 70 and 71 (Fig. 6) as previously described.

Timer 139 is operatively connected to valve 152 by conduit 154. Opening of valve 152 connects the punch 44 with a source of a vacuum 155 through conduits 156, 157 and 95, the latter two which are coupled together by swivel coupling 96. This applies vacuum to the cutter 89 of the punch 44 to draw the slug cut from tube section T into the opening 91 of the cutter 89, as previously described, to hold the slug until it is ejected by the application of air pressure.

Timer 139 next closes normally open diaphragm valve 158 and opens normally closed diaphragm valve 159. Timer 139 is operatively connected to the valves 158 and 159 by conduit 160. Closing valve 158 disconnects the manifold 140 from the upper end of air cylinder 52 which is normally connected thereto through conduits 161 and 162 and opening valve 159 connects the manifold 140 to the lower end of the air cylinder 52 through conduits 161 and 163. This admits air pressure in the lower end of the cylinder 52 to extend the piston rod 51 thereof. Immediately after extension of the piston rod the timer allows valve 158 to open and valve 159 to close to admit air under pressure through conduits 161 and 163 to the lower end of the cylinder 52 to again retract the piston rod 51. This gives one complete reciprocation of the piston rod 51 and the cam actuator 48 secured to the end thereof so that the turret 43 is indexed 120° by reason of the engagement of the actuator 48 with the cam groove 49 of the barrel cam 47.

This indexing of the turret 43 brings the cleaning tool assembly 45 into alignment with the anvil 27 and the section of inner tube stock T clamped thereto. Timer 139 then again opens valve 147 and closes valve 148 to admit pressure to the upper end of the cylinder 98 to force the cleaning tool 45 against the tube section T carried by the anvil 27. At the same time, timer 139 closes normally open diaphragm valve 164 and opens normally closed diaphragm valve 165. Valves 164 and 165 are operatively connected to timer 139 by conduit 166. Closing valve 164 disconnects the manifold 140 from one end of air cylinder 111 to which it is normally connected by conduits 167 and 168 and opening valve 165 connects the manifold 140 to the other end of the cylinder 111 through conduits 167 and 169. This admits pressure to the cylinder 111 to retract its piston rod 110 so that the rack 109 attached to the end thereof rotates shaft 101 and the plowing member 100 attached to the end thereof to clean the surface of the tube surrounding the previously punched hole.

Timer 139 then closes valve 147 and opens valve 148 to retract the piston rod 97 of cylinder 98 and opens valve 165 and closes valve 164 to extend piston rod 110 of cylinder 111. The cleaning tool 45 then moves upwardly under the influence of the compressed springs 107 and 108 (Fig. 8).

The turret 43 is again indexed 120° by opening and closing valves 158 and 159 by the timer 139 in the manner previously described. This brings the valve applicator assembly 46 into alignment with the air cylinder 98 and the anvil 27. Timer 139 again opens valve 147 and closes valve 148 to extend the piston rod 97 of the air cylinder 98 to move shaft 124 and the valve holder 128 downwardly to press a rubber based valve stem over the hole punched in the inner tube section T. Pressure is maintained from between 3 and 5 seconds to insure that the valve stem is properly adhered to the tube section T. During this time, timer 139 closes valve 152 to disconnect the cutter 89 from the various vacuum source 155. At the same time, timer 139 opens normally closed diaphragm valve 170. Valve 170 is operatively connected to timer 139 by conduit 171. Opening valve 170 connects the manifold 140 with the punch 44 through condutis 172, 157 and 95. This admits air under pressure to to the opening 91 in the punch 89 to eject the slug previously held therein by the application of vacuum.

Timer 139 next closes valve 147 and opens valve 148 to retract the piston rod 97 of cylinder 98. Valve applicator 46 then moves upwardly under the influence of the springs 135 and 136 (Fig. 10).

The turret 43 is again indexed 120° by opening and closing of valves 158 and 159 by the timer 139. This brings the punch assembly 44 again into alignment with the anvil 27. Timer 139 then opens valve 143 to release the pressure on cylinder 57. The piston rod 59 of cylinder 57 is spring biased so that it retracts when the pressure is released and the clamp 54 pivots upwardly to release the tube section T.

This completes the cycle of operation of the valve applicating apparatus 11. Concurrently the trimming and splicing apparatus 10 goes through its operation in trimming and splicing as described in U. S. Patent 2,576,940 and completes its cycle simultaneously with the completion of the cycle of the valve applicating apparatus 11. The total elapsed time is about 15 seconds. The tube when removed from the machine is complete except for curing, which is done in the conventional manner.

From the foregoing description it can be seen that there is provided a combined machine which will automatically trim and splice a section of inner tube stock and simultaneously therewith apply a valve stem at a fixed distance from the splice.

It is to be understood that the above description and accompanying drawings are for the purpose of illustration only and not by way of limitation and that changes and modifications may be made therein without departing from the spirit and the scope of the invention.

Having thus described my invention, what I claim and desire to protect by Letters Patent is:

1. Apparatus for manufacturing inner tubes comprising, means for trimming and splicing the ends of the section of inner tube stock including clamping means for clamping each end of said section of inner tube stock and means for effecting relative movement between said clamping means to force the ends of said inner tube stock together to form a splice, valve stem applicating means, and means for supporting and maintaining said valve applicating means at a fixed distance from one of said clamping means during splicing of the ends of said section of inner tube stock whereby a valve stem may be applied at a fixed distance from said splice simultaneously with the splicing of the ends of said length of inner tube stock.

2. Apparatus for manufacturing inner tubes comprising, a pair of carriages movable towards and away from each other, clamping means on each carriage for clamping end portions of a section of inner tube stock, means for trimming the ends of said stock extending from opposed faces of said clamps, means for moving the carriages together to splice the trimmed ends of the stock, an anvil movable with one of said carriages for supporting said stock over a portion of its length, means for clamping said stock on said anvil, a support movable with said one carriage, and means carried by said support for performing operations for the application of a valve stem to said length of inner tube stock carried by said anvil whereby a valve stem may be applied contemporaneously with the trimming and splicing of the ends of the inner tube stock.

3. Apparatus for manufacturing inner tubes comprising, a pair of carriages movable towards and away from each other, clamping means on each carriage for clamping end portions of a section of inner tube stock, means for trimming the ends of said stock extending from opposed faces of said clamps, means for moving the carriages together to splice the trimmed ends of the stock, an anvil movable with one of said carriages for supporting said stock over a portion of its length, means for clamping said stock on said anvil, a support movable with said one carriage, and valve stem applicating means carried by said support for applying the valve stem to said length of stock carried by said anvil whereby a valve stem may be applied contemporaneously with the trimming and splicing of the ends of the inner tube stock, said valve stem applicating means including a punch for punching a hole in the stock, means for cleaning the surface of the stock around said hole, and means for pressing a valve stem over said hole.

4. Apparatus for manufacturing inner tubes comprising, a pair of carriages movable towards and away from each other, clamping means on each carriage for clamping end portions of a section of inner tube stock, means for trimming the ends of said stock extending from said clamping means, means for moving said carriages together to splice the trimmed ends of the stock, an anvil movable with one of said carriages for supporting said stock over a portion of its length, means for clamping said stock on said anvil, a support movable with said one carriage, and a turret rotatably mounted on said support, a plurality of tools for applying valve stems carried by said turret, means for indexing said turret to bring each of said tools sequentially into alignment with said anvil, and means for operating each of said tools to perform its intended operation in applying a valve stem to the inner tube stock carried by said anvil whereby a valve stem may be applied to said inner tube stock simultaneously with the trimming and splicing of the ends of the inner tube stock.

5. Apparatus for manufacturing inner tubes comprising, a pair of carriages movable towards and away from each other, clamping means on each carriage for clamping end portions of a section of inner tube stock, means for trimming the ends of said stock extending from opposed faces of said clamps, means for moving the carriages together to splice the trimmed ends of the stock, an anvil movable with one of said carriages for supporting said stock over a portion of its length, means for clamping said stock on said anvil, a support movable with said one carriage, a turret rotatably mounted on said support, a plurality of reciprocable tools for applying valve stems carried by said turret, means for indexing said turret to bring each of said tools sequentially into alignment with said anvil, means for reciprocating each of said tools when it is in alignment with said anvil to perform its intended operation in applying a valve stem to said inner tube stock carried by said anvil, whereby a valve stem may be applied simultaneously with the trimming and splicing of the ends of the inner tube stock.

6. Apparatus for manufacturing inner tubes comprising, a pair of carriages movable towards and away from each other, clamping means on each carriage for clamping end portions of a section of inner tube stock, means for trimming the ends of said stock extending from opposed faces of said clamps, means for moving the carriages together to splice the trimmed ends of the stock, an anvil movable with one of said carriages for supporting said stock over a portion of its length, means for clamping said stock on said anvil, a support movable with said one carriage, a turret carried by said support, a reciprocal punch, a reciprocal and rotatable cleaning member, and a reciprocal valve stem holder carried by said turret, means for indexing said turret to bring said punch, said rotatable cleaning member and said valve holder sequentially into alignment with said anvil, means for reciprocating said punch, said cleaning member and said valve stem holder when each is in alignment with said anvil to sequentially punch a hole in said tube stock carried by said anvil, clean the surface of the tube stock around the hole and apply a valve stem over the punched hole and means for rotating said cleaning member when it is reciprocated.

7. Apparatus for use in manufacturing inner tubes comprising, a pair of carriages movable towards and away from each other, clamping means on each carriage for clamping end portions of a section of inner tube stock, means for trimming the ends of said inner tube stock extending from said clamping means, means for moving the carriages together to splice the trimmed ends of the stock, an anvil secured to one of said carriages for supporting said stock over a portion of its length, means for clamping said stock on said anvil, a third carriage coupled to said one carriage and movable therewith, and means carried by said third carriage for performing operations for the application of a valve stem to said portion of said stock carried by said anvil, whereby a valve stem may be applied to said inner tube stock carried by said anvil contemporaneously with the trimming and splicing of said stock.

8. A machine for manufacturing inner tubes comprising, an anvil for supporting a section of inner tube stock, a turret rotatably mounted above said anvil, a plurality of vertically extending elongated shafts slidably mounted for independent vertical movement on said turret at circumferentially spaced points around said turret, a punch secured to the lower end of one of said shafts, a valve stem holder secured to the lower end of another of said shafts, means for indexing said turret to move each of said shafts sequentially into alignment with said anvil, means mounted above said turret and anvil for sequentially forcing each shaft towards said anvil when each shaft is in a position of alignment above said anvil whereby a hole is punched in said section of inner tube stock by said punch secured to the lower end of one of said shafts and a valve stem is applied over said hole by the valve stem holder secured to the lower end of another of said shafts.

9. A machine for manufacturing inner tubes comprising, an anvil for supporting a section of inner tube stock, a fluid actuated cylinder mounted above said anvil, said cylinder having a piston rod which is extensible towards said anvil, a turret rotatably mounted between said anvil and said cylinder, a plurality of vertically extending elongated shafts slidably mounted for independent vertical movement on said turret at circumferentially spaced points around said turret, a punch secured to the lower end of one of said shafts, a valve stem holder secured to the lower end of another of said shafts, means for indexing said turret to move said shafts sequentially into a position of alignment with said anvil and said piston rod, means for admitting fluid under pressure to said cylinder to extend the piston rod thereof each time one of said shafts is in alignment with said piston rod whereby each shaft is sequentially forced toward said anvil and a hole is punched in the inner tube section carried by said anvil by said punch secured to the lower end of one of said shafts and a valve stem is applied over said punched hole by the valve stem holder secured to the lower end of another of said shafts.

References Cited in the file of this patent

UNITED STATES PATENTS

| | | |
|---|---|---|
| 1,622,256 | Stevens | Mar. 22, 1927 |
| 1,761,754 | Shook | June 3, 1930 |
| 1,763,099 | Mead | June 10, 1930 |
| 1,981,808 | Maranville | Nov. 20, 1934 |
| 2,161,775 | Miller et al. | June 6, 1939 |
| 2,186,286 | Engler et al. | Jan. 9, 1940 |
| 2,233,637 | Patrick | Mar. 4, 1941 |
| 2,272,895 | Stevens | Feb. 10, 1942 |
| 2,273,185 | Engler et al. | Feb. 17, 1942 |
| 2,311,600 | Shook | Feb. 16, 1943 |
| 2,354,432 | Stevens | July 25, 1944 |
| 2,372,382 | Krusemark | Mar. 27, 1945 |